Nov. 3, 1964
L. N. JOHNSON
3,155,249
BOAT SUPPORT FOR TRAILERS
Filed Nov. 9, 1961
3 Sheets-Sheet 1
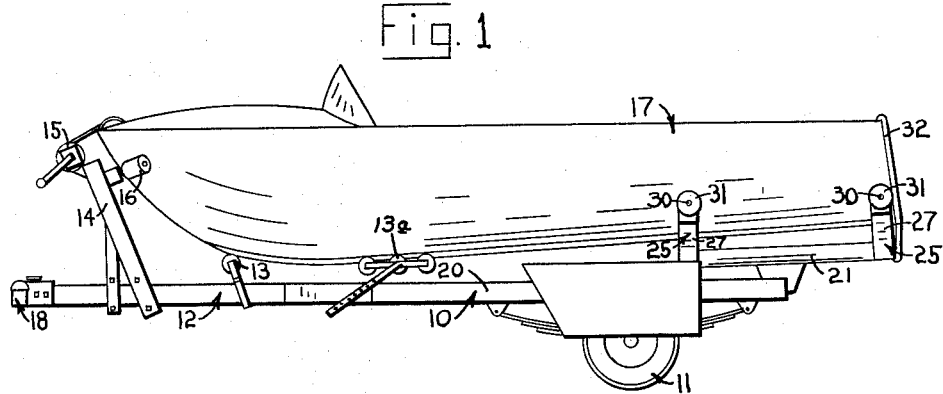
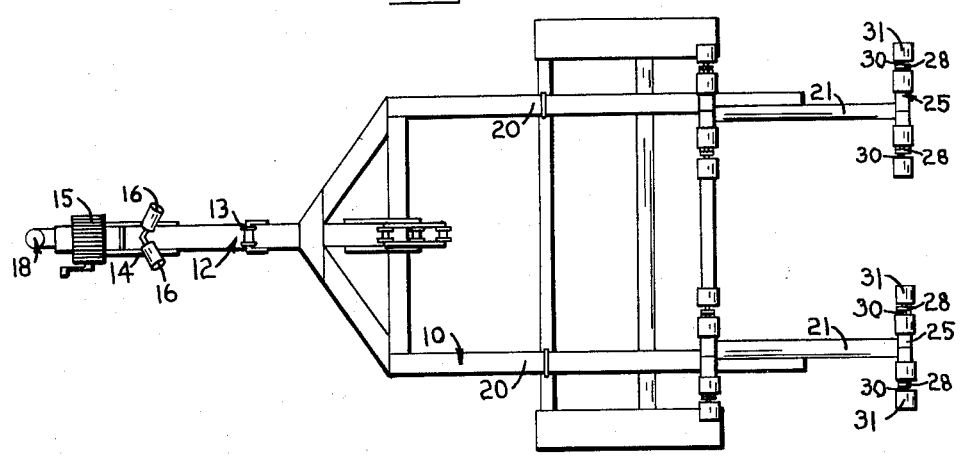
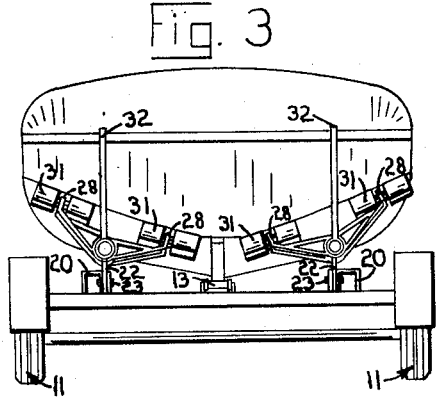
INVENTOR.
LAWRENCE N. JOHNSON
BY
Wells & St. John
ATTYS.

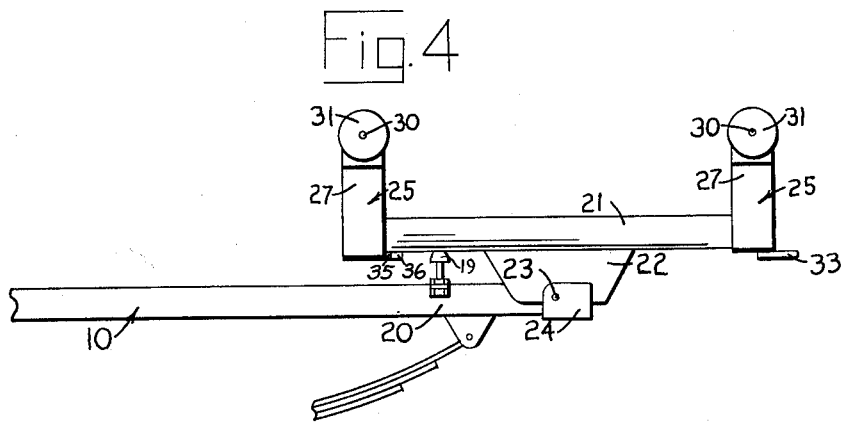
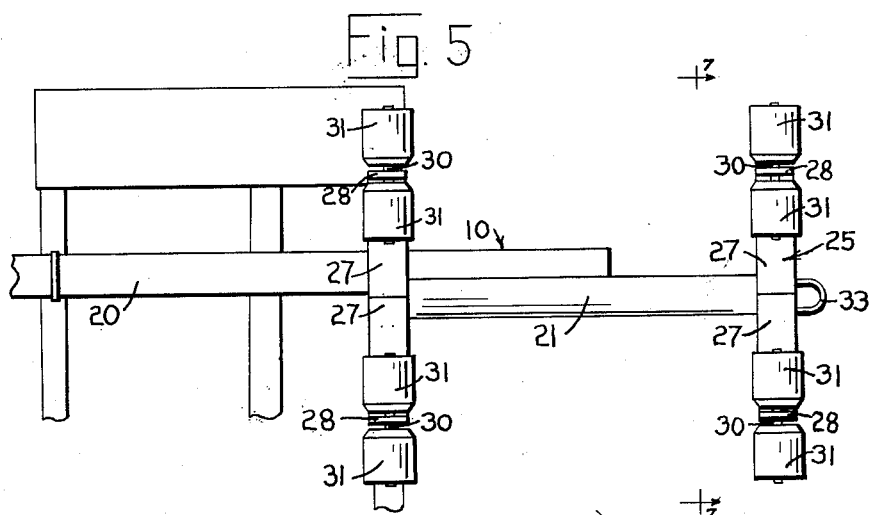
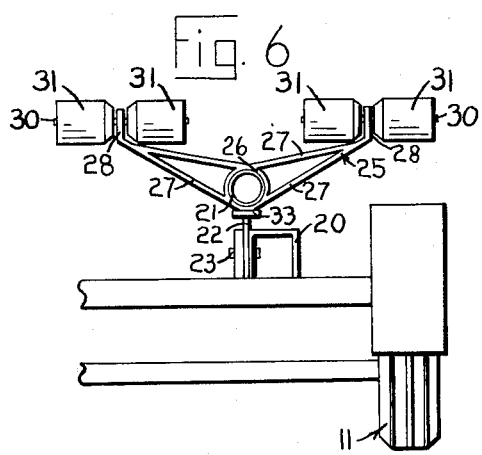
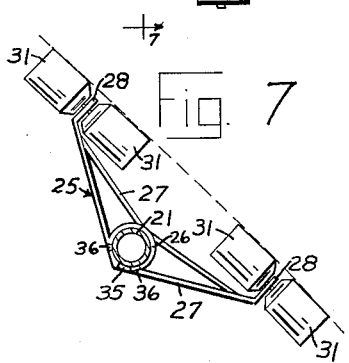
INVENTOR.
LAWRENCE N. JOHNSON
BY Wells & St. John
ATTYS.

Nov. 3, 1964
L. N. JOHNSON
3,155,249
BOAT SUPPORT FOR TRAILERS
Filed Nov. 9, 1961
3 Sheets-Sheet 3
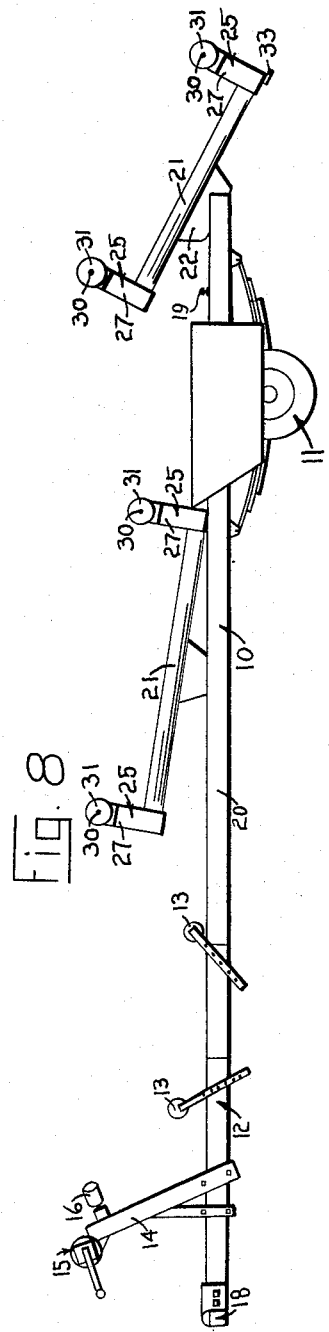
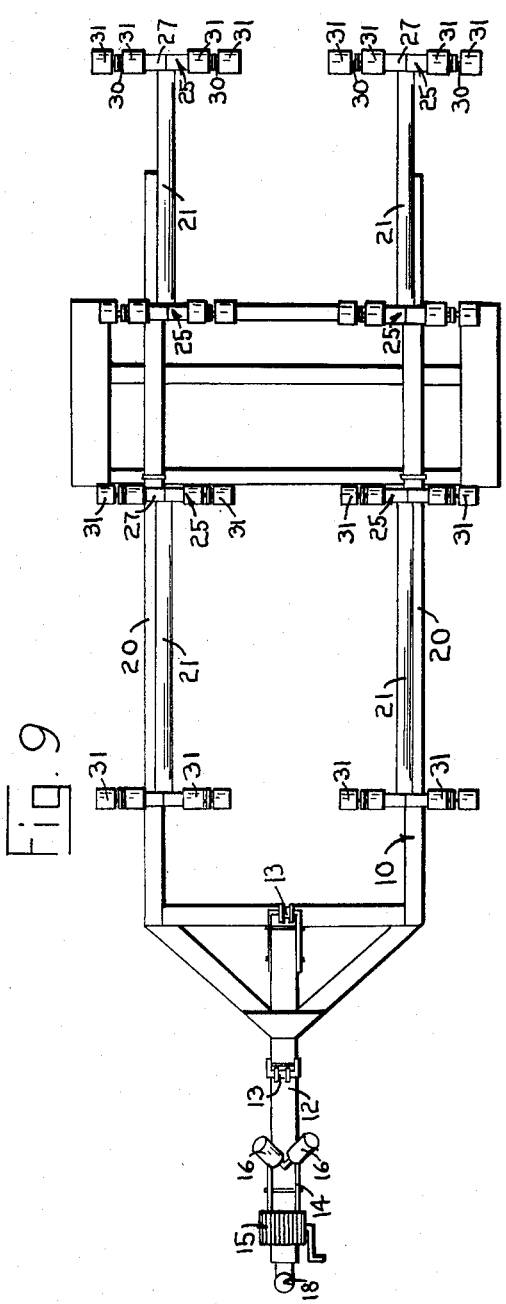
INVENTOR.
LAWRENCE N. JOHNSON
BY
*Wallo & St. John*
ATTYS.

United States Patent Office 3,155,249
Patented Nov. 3, 1964

1

3,155,249
BOAT SUPPORT FOR TRAILERS
Lawrence N. Johnson, % Modern Frame & Rebuild,
N. 637 Hamilton, Spokane, Wash.
Filed Nov. 9, 1961, Ser. No. 151,248
2 Claims. (Cl. 214—84)

This invention relates to a novel supporting mechanism for boat trailers.

The modern acceptance of boating as a hobby, in inland as well as coastal areas, has produced a varied line of boat trailers used to transport and store pleasure craft when not actually in the water. A suitable trailer must securely cradle a boat and yet must serve as a flexible launching device. Most important, the supporting elements of the trailer must conform to the contact hull contour, so that the pressures exerted thereby will be proportionately distributed and will not cause localized stress and resulting damage to the hull.

It is a first object of this invention to provide a boat support which eliminates the necessity of hinging the trailer frame for launching purposes. The support itself provides the necessary vertical movement to facilitate placement or removal of the boat relative to the water.

It is a most important object of this invention to provide a boat trailer which requires no adjustment of the main supporting structure and which is capable of readily accepting boats of varying lengths and hull contours.

Another object of this invention is to provide a boat support constructed simply, using readily-available structural elements. The trailer construction requires no specialized tooling and no close tolerances must be maintained.

These and further objects will be evident from a study of the following description and the accompanying drawings which illustrate a preferred form of the invention. This form is merely exemplary and is not intended to exhaust the capabilities of the invention which is limited by the definitions in the claims which follow.

In the drawings:

FIGURE 1 is a side view of a trailer equipped according to this invention, showing a boat supported thereon;

FIGURE 2 is a top view of the trailer alone;

FIGURE 3 is a rear end view of the trailer and boat as seen in FIGURE 1;

FIGURE 4 is a side view of a single support assembly;

FIGURE 5 is a top view of the assembly illustrated in FIGURE 4;

FIGURE 6 is a rear end view of the assembly illustrated in FIGURE 4;

FIGURE 7 is a sectional view taken along line 7—7 in FIGURE 5;

FIGURE 8 is a side view of a trailer utilizing tandem support assemblies; and

FIGURE 9 is a top view of the trailer shown in FIGURE 7.

Referring to the drawings, the instant support assembly is shown in FIGURES 1–7 as used on trailers designed for small or medium length boats. The tandem arrangement illustrated in FIGURES 8 and 9 is designed for larger boats such as the "cabin cruiser" class. The basic trailer assembly is similar in each instance and is designated by identical reference numerals.

Each trailer includes a rigid mobile frame 10 mounted on wheels 11 in the conventional manner. A tongue 12, secured rigidly to frame 10, is provided with a vertically adjustable keel roller 13 and a stand 14 on which is mounted a conventional winch 15. A set of pivoted keel rollers 13a is adjustably mounted at the rear end of the tongue 12. Stand 14 also mounts a pair of diverging rollers 16 designed to abut the prow of a boat 17 mounted on the trailer. Winch 15 is utilized to draw the boat 17 along the length of the trailer and to secure it at a forward position. A suitable hitch 18 is provided at the front end of tongue 12. In FIGURES 8 and 9, a pair of single keel rollers 13 are utilized.

Each frame 10 includes a pair of side longitudinal channels 20 located at each side of the longitudinal center line of frame 10. The novel boat supports, with which this description is concerned, are mounted adjacent these channels 20.

Each support includes a longitudinal member 21 formed of suitable tubular material and provided with a downwardly extending ear 22 intermediate its ends. The ear 22 is pivotally joined to the respective channel 20 with which it is associated. This pivotal joinder is effected by a pin 23 supported by one side flange of channel 20 and an integral bracket 24. The axis of pin 23 serves as the pivotal axis of member 21 and is located perpendicular to a plane containing the central longitudinal axis of member 21.

Located at each end of member 21 is a roller assembly 25. Each roller assembly 25 is identical. It includes a collar 26 rotatably mounted on the tubular member 21 for pivotal motion about the central longitudinal axis thereof. It further includes a pair of diverging arms 27 fixed to collar 26 and terminating in parallel portions 28. The portions 28 are apertured in a coaxial manner. Each receives a roller shaft 30 in a vertically elongated aperture. Each shaft 30 rotatably carries a pair of rollers 31. The rollers 31 are located at each side of the supporting portion 28. It is important to note that the rollers 31 extend on each side of a plane perpendicular to the roller axes and drawn through the central longitudinal axis of the supporting member 21.

The pivotal motion of the entire support about the axis of pin 23 and the motion of each roller assembly 25 about the axis of member 21 is preferably a relatively stiff frictional movement, achieved by simple mechanical tightening of the respective parts. This is utilized to retain the respective members in positions to effectively receive a boat from water and to prevent unnecessary boat movement during travel. At any rate, the members must be capable of movement in response to the weight of the boat alone. They must be free to pivot as a boat hull contacts the rollers 31.

It is important that the angular motion of the pivoted members be limited. Clockwise rotation of the rear members 21 is preferably limited by the design of ear 22 and bracket 24, plus the location of pin 23. The maximum angle subtended by the central longitudinal axis of member 21 is preferably 45 degrees. If allowed to pivot beyond such a limit, the rollers 31 will force the member 21 to a near vertical position when engaged by a sharp boat prow, thereby defeating the lifting advantages inherent in this pivoted support assembly.

Counterclockwise motion of element 21 is preferably limited by an adjustable stop 19 mounted on channel 20 directly below member 21. Stop 19 should be adjusted for each boat when loaded, in order to prevent the front end of member 21 from tilting downwardly when a boat is tied to its rear end. This prevents motion of the boat during travel.

Limitation of the angular motion of the forward elements in FIGURES 8 and 9 is insured by contact with channels 20.

The angular rotation of each roller assembly 25 is limited by protruding abutment 35 fixed to each collar 26. The abutments 35 are contacted by stops 36 fixed to the elements 21 in the rotation paths of abutments 35. The stops 36 are preferably located so as to limit the angular positions of assemblies 25 between the horizontal position illustrated in FIGURE 6 and the position shown in FIGURE 7 wherein the rollers 31 attain a 45 degree position relative to the horizontal. Again, if the roller assemblies 25 are allowed to tilt inwardly to approach a vertical prow surface, the necessary leverage needed to lift the boat will be lost.

The loose mounting of rollers 31 for motion in a vertical plane allows the rollers 31 to mate with a convex surface as shown in FIGURE 3, or with a more common concave surface, illustrated by the line 37 in FIGURE 7. Full contact of each roller 31 is assured, regardless of the hull contour resting thereon.

The two trailers function similarly. The smaller trailer in FIGURES 1–3 has only two sets of supports, which are located at the rear end of frame 10. The larger trailer illustrated in FIGURES 8 and 9 utilizes tandem sets of supports mounted in side-by-side pairs on a lengthened frame 10. The additional rollers 31 serve to adequately support the weight of a larger boat and eliminate any vast gaps between roller support surfaces along the length of the trailer.

The roller assemblies automatically adjust to the contacted hull contour of a supported boat 17. The two sets of rollers 31 on each roller assembly 25 balance the cross-sectional boat weight between them. Similarly the weight distribution between each pair of roller assemblies 25 is balanced by the pivotal motion of member 21. In the case of the rearmost members 21 it is preferable to place the pivotal axis of the member nearer to the rear roller assembly 25, since more weight is normally concentrated at the transom of a boat 17 than at its forward portions. The free pivotal motion of roller assemblies 25 and member 21 further acts as a self-centering device and guides the boat hull along the length of frame 10 until the boat keel is resting on rollers 13 and the boat prow is contacted by rollers 16.

The boat 17 is secured by straps 32 anchored to a bracket 33 fixed at the rear ends of the rearmost members 21. It should also be noted that the rearmost members 21 extend rearwardly of frame 10. This allows the members 21 to pivot downwardly during launching of a boat and to thereby gently lower the prow into the water. Conversely, during loading of a boat from the water, the rearmost rollers 31 can engage the hull of boat 17 while floating and which 15 can be used to draw the boat 17 across the rollers 31 without lifting the boat manually. This factor eliminates the necessity of a hinged frame on the trailer, which has been used extensively to facilitate launching and loading of boats.

The supports as disclosed herein allow a single trailer to be used in the transport of many sizes of boats, varying in width, length and hull contour. The only necessary adjustments are concerned with the positioning of rollers 13, 13a and 16. The wheel chassis is preferably movable longitudinally for balance. These adjustments may be approximate. The weight of the boat will be borne principally by rollers 31, which can be seen to be fully automatic in adapting themselves to any hull contour. The even weight distribution guaranteed by this simple unit can be achieved by manually adjustable rollers only by the maintenance of very close dimensional tolerances. The time saved in preparing the above described trailers for use with a particular boat is considerable.

It should be evident that my support may be used in trailers having different frame constructions other than the illustrated examples. Modifications are possible in the design of the supporting components, so long as the basic concept of a balanced, freely movable dual support is retained. For these reasons, the following claims are intended as the only limiting definitions of my invention.

Having thus described my invention, I claim:
1. In a boat trailer:
 a rigid wheeled supporting frame for connection to a towing vehicle comprising a pair of identical rearwardly protruding longitudinal frame members, the rear portions of said frame members being open and unconnected;
 a pair of identical longitudinal members respectively supported on said frame members for independent pivotal rotation about a common transverse axis located adjacent the rear ends of said frame members, said longitudinal members each being pivotally mounted intermediate its ends in identical fashion and each being extended rearwardly of said frame members an identical distance;
 a pair of diverging arms mounted respectively at each end of each of said longitudinal members, each pair of said arms being independently rotatable about an axis extending parallel to the longitudinal member on which it is mounted, the outer ends of each pair of said arms terminating in two spaced parallel sections; and
 a roller mounted respectively on each side of said parallel sections, each of said rollers being rotatably journalled in spaced pairs on an individual cross-shaft journalled at its midpoint on the parallel section on which it is mounted, said rollers being adapted to contact the hull of the boat being drawn in a forward direction relative to said frame, there being no additional boat contacting elements mounted on said frame intermediate said longitudinal members other than said rollers.
2. In a boat trailer:
 a rigid wheeled supporting frame for connection to a towing vehicle comprising a pair of identical rearwardly protruding longitudinal frame members, the rear portions of said frame members being open and and unconnected;
 a pair of identical longitudinal members respectively supported on said frame members for independent pivotal rotation about a common transverse axis located adjacent the rear ends of said frame members, said longitudinal members each being pivotally mounted intermediate its ends in identical fashion and each being extended rearwardly of said frame members an identical distance;
 a pair of diverging arms mounted respectively at each end of each of said longitudinal members, each pair of said arms being independently rotatable about an axis extending parallel to longitudinal member on which it is mounted, the outer ends of each pair of said arms terminating in two spaced parallel sections;
 a roller mounted respectively on each side of said parallel sections, each of said rollers being rotatably journalled in spaced pairs on an individual cross-shaft journalled at its midpoint on the parallel section on which it is mounted, each cross shaft being received within an aperture directed co-axially with respect to corresponding aperture in the remaining section of the arm on which it is mounted, the mounting of said cross shafts within said apertures being such as to allow limited angular motion of the cross shaft relative to the arms as well as free rotational movement there being no additional boat contacting elements mounted on said frame intermediate said longitudinal members other than said rollers.

References Cited in the file of this patent
UNITED STATES PATENTS

| | | |
|---|---|---|
| 2,676,716 | Sallis | Apr. 27, 1954 |
| 2,816,672 | Facchini | Dec. 17, 1957 |
| 2,827,188 | Reeder | Mar. 18, 1958 |
| 2,828,036 | White | Mar. 25, 1958 |
| 2,889,946 | Holsclaw | June 9, 1959 |
| 2,948,423 | Capuano | Aug. 9, 1960 |
| 3,029,960 | Evans | Apr. 17, 1962 |
| 3,104,770 | Calkins et al. | Sept. 24, 1963 |